(12) United States Patent
Kasravi et al.

(10) Patent No.: US 11,373,224 B2
(45) Date of Patent: *Jun. 28, 2022

(54) BUSINESS EVENT PROCESSING

(71) Applicant: eBay Inc., San Jose, CA (US)

(72) Inventors: Kam Kasravi, San Jose, CA (US); Vadim Geshel, San Francisco, CA (US); Sergiy Pereshyvaylo, San Jose, CA (US); Angie Ruan, Los Gatos, CA (US); Yitao Yao, Saratoga, CA (US); Maxim Drobintsev, Campbell, CA (US)

(73) Assignee: EBAY INC., San Jose, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/699,820

(22) Filed: Dec. 2, 2019

(65) Prior Publication Data
US 2020/0143441 A1    May 7, 2020

Related U.S. Application Data

(63) Continuation of application No. 16/219,141, filed on Dec. 13, 2018, now Pat. No. 10,515,396, which is a continuation of application No. 15/904,729, filed on Feb. 26, 2018, now Pat. No. 10,185,979, which is a continuation of application No. 15/210,555, filed on Jul. 14, 2016, now Pat. No. 9,984,397, which is a
(Continued)

(51) Int. Cl.
| | |
|---|---|
| *G06Q 30/06* | (2012.01) |
| *G06F 9/46* | (2006.01) |
| *G06Q 30/08* | (2012.01) |
| *G06Q 10/00* | (2012.01) |
| *G06Q 10/06* | (2012.01) |

(52) U.S. Cl.
CPC ........ *G06Q 30/0601* (2013.01); *G06F 9/466* (2013.01); *G06Q 10/00* (2013.01); *G06Q 10/0633* (2013.01); *G06Q 10/06316* (2013.01); *G06Q 30/0631* (2013.01); *G06Q 30/08* (2013.01)

(58) Field of Classification Search
None
See application file for complete search history.

(56) References Cited

U.S. PATENT DOCUMENTS

| | | |
|---|---|---|
| 5,724,584 A | 3/1998 | Peters et al. |
| 5,857,190 A | 1/1999 | Brown |

(Continued)

OTHER PUBLICATIONS

Microsoft Press, "Microsoft Computer Dictionary", Fifth Edition, 2002, 499 pages.

(Continued)

*Primary Examiner* — Qing Yuan Wu
(74) *Attorney, Agent, or Firm* — Schwegman Lundberg & Woessner, P.A.

(57) ABSTRACT

In some examples, a method includes identifying a first listing and an additional listing having one or more characteristics in common, the first listing and the additional listing published on an online marketplace; receiving a request to perform an operation on the first listing and the additional listing; in response to the request, generating a batch of events based on the operation, the batch of events including a first event to be performed on the first listing and a second event to be performed on the additional listing; performing the first event on the first listing and the second event on the additional listing.

21 Claims, 7 Drawing Sheets

Related U.S. Application Data continuation of application No. 14/862,550, filed on Sep. 23, 2015, now Pat. No. 9,589,286, which is a continuation of application No. 14/592,752, filed on Jan. 8, 2015, now Pat. No. 9,152,989, which is a continuation of application No. 14/230,576, filed on Mar. 31, 2014, now Pat. No. 8,959,532, which is a continuation of application No. 14/100,223, filed on Dec. 9, 2013, now Pat. No. 8,769,538, which is a continuation of application No. 13/602,936, filed on Sep. 4, 2012, now Pat. No. 8,631,422, which is a continuation of application No. 12/772,609, filed on May 3, 2010, now Pat. No. 8,261,289, which is a continuation of application No. 11/171,595, filed on Jun. 30, 2005, now Pat. No. 7,779,421.

(56) References Cited

U.S. PATENT DOCUMENTS

| | | | |
|---|---|---|---|
| 6,092,053 | A | 7/2000 | Boesch et al. |
| 6,367,034 | B1 | 4/2002 | Novik et al. |
| 6,393,458 | B1 | 5/2002 | Gigliotti et al. |
| 6,711,620 | B1 | 3/2004 | Yoshii et al. |
| 7,219,239 | B1 | 5/2007 | Njemanze et al. |
| 7,249,356 | B1 | 7/2007 | Wilson et al. |
| 7,395,523 | B2 | 7/2008 | Bates et al. |
| 7,412,501 | B2 | 8/2008 | Sanghvi et al. |
| 7,496,952 | B2 | 2/2009 | Edwards, Jr. |
| 7,779,421 | B2 | 8/2010 | Kasravi et al. |
| 7,844,639 | B2 | 11/2010 | Cohen et al. |
| 8,261,289 | B2 | 9/2012 | Kasravi et al. |
| 8,631,422 | B2 | 1/2014 | Kasravi et al. |
| 8,769,538 | B2 | 7/2014 | Kasravi et al. |
| 8,959,532 | B2 | 2/2015 | Kasravi et al. |
| 9,152,989 | B2 | 10/2015 | Kasravi et al. |
| 9,589,286 | B2 | 3/2017 | Kasravi et al. |
| 9,984,397 | B2 | 5/2018 | Kasravi et al. |
| 10,185,979 | B2 | 1/2019 | Kasravi et al. |
| 10,515,396 | B2 | 12/2019 | Kasravi et al. |
| 2002/0010804 | A1 | 1/2002 | Sanghvi et al. |
| 2002/0016765 | A1 | 2/2002 | Sacks |
| 2002/0052806 | A1 | 5/2002 | Hodson et al. |
| 2002/0069139 | A1 | 6/2002 | Bernstein et al. |
| 2002/0087430 | A1 | 7/2002 | Davis et al. |
| 2002/0099622 | A1 | 7/2002 | Langhammer |
| 2002/0103752 | A1 | 8/2002 | Berger et al. |
| 2002/0133414 | A1 | 9/2002 | Pradhan et al. |
| 2002/0143637 | A1 | 10/2002 | Shmueli et al. |
| 2003/0050983 | A1 | 3/2003 | Johnson |
| 2003/0078991 | A1 | 4/2003 | Harris |
| 2004/0205773 | A1 | 10/2004 | Carcido et al. |
| 2004/0254855 | A1 | 12/2004 | Shah |
| 2005/0114223 | A1 | 5/2005 | Schneider |
| 2006/0184944 | A1 | 8/2006 | Schwerk |
| 2006/0190389 | A1 | 8/2006 | Molloy |
| 2007/0005410 | A1 | 1/2007 | Kasravi et al. |
| 2007/0100706 | A1 | 5/2007 | Raccah et al. |
| 2010/0211952 | A1 | 8/2010 | Kasravi et al. |
| 2012/0330775 | A1 | 12/2012 | Kasravi et al. |
| 2014/0095347 | A1 | 4/2014 | Kasravi et al. |
| 2014/0214477 | A1 | 7/2014 | Kasravi et al. |
| 2015/0120481 | A1 | 4/2015 | Kasravi et al. |
| 2016/0012370 | A1 | 1/2016 | Kasravi et al. |
| 2016/0321743 | A1 | 11/2016 | Kasravi et al. |
| 2018/0182006 | A1 | 6/2018 | Kasravi et al. |
| 2019/0114684 | A1 | 4/2019 | Kasravi et al. |

OTHER PUBLICATIONS

Aulman, "Review: Turbo Lister, eBay's New Bulk-Listing Tool", Retrieved from the Internet URL: <http://www.ecommercebytes.com/cab/abu/y202/m10/abu0081/s03>, Oct. 20, 2002, 2 pages.
Notice of Allowance received for U.S. Appl. No. 16/219,141, dated Aug. 20, 2019, 7 pages.
Non-Final Office Action received for U.S. Appl. No. 16/219,141, dated Jul. 10, 2019, 11 pages.
Response to Non-Final Office Action filed on Aug. 6, 2019, for U.S. Appl. No. 16/219,141, dated Jul. 10, 2019, 11 pages.
BayWares—Tools for Online Seller, Retrieved from the Internet URL :<http:/baywares.com/host/bw /index.asp>, Sep. 30, 2002, 2 pages.
"Sending Items to Online Auction", Nov. 3, 2004, 1 page.
Advisory Action received for U.S. Appl. No. 11/171,595, dated Nov. 6, 2009, 3 pages.
Final Office Action received for U.S. Appl. No. 11/171,595, dated Sep. 25, 2009, 14 pages.
Non-Final Office Action received for U.S. Appl. No. 11/171,595, dated Feb. 5, 2009, 14 pages.
Notice of Allowance received for U.S. Appl. No. 11/171,595, dated Jan. 21, 2010, 20 pages.
Response to Final Office Action and Advisory Action filed on Dec. 28, 2009, for U.S. Appl. No. 11/171,595, dated Sep. 25, 2009 and Nov. 6, 2009, 13 pages.
Response to Final Office Action filed on Oct. 22, 2009, for U.S. Appl. No. 11/171,595, dated Sep. 25, 2009, 12 pages.
Response to Non-Final Office Action filed on Jun. 5, 2009, for U.S. Appl. No. 11/171,595, dated Feb. 5, 2009, 14 pages.
Final Office Action received for U.S. Patent Application No. 12/772,609, dated Sep. 8, 2011, 9 pages.
Non-Final Office Action received for U.S. Appl. No. 12/772,609, dated Jan. 24, 2011, 14 pages.
Notice of Allowance received for U.S. Patent Application No. 12/772,609, dated May 3, 2012, 7 pages.
Response to Final Office Action filed on Dec. 8, 2011, for U.S. Appl. No. 12/772,609, dated Sep. 8, 2011, 12 pages.
Response to Non-Final Office Action filed on Jun. 23, 2011, for U.S. Patent Application No. 12/772,609, dated Jan. 24, 2011, 11 pages.
Non-Final Office Action received for U.S. Appl. No. 13/602,936, dated Apr. 2, 2013, 7 pages.
Notice of Allowance received for U.S. Appl. No. 13/602,936, dated Sep. 11, 2013, 6 pages.
Response to Non-Final Office Action filed on Jul. 2, 2013, for U.S. Appl. No. 13/602,936, dated Apr. 2, 2013, 9 pages.
Final Office Action received for U.S. Appl. No. 14/100,223, dated Jan. 9, 2014, 6 pages.
Notice of Allowance received for U.S. Appl. No. 14/100,223, dated Feb. 20, 2014, 8 pages.
Preliminary Amendment filed for U.S. Appl. No. 14/100,223, filed Dec. 10, 2013, 6 pages.
Response to Final Office Action filed on Jan. 30, 2014, for U.S. Appl. No. 14/100,223, dated Jan. 9, 2014, 9 pages.
Final Office Action received for U.S. Appl. No. 14/230,576, dated Jul. 22, 2014, 8 pages.
Non-Final Office Action received for U.S. Appl. No. 14/230,576, dated Jun. 2, 2014, 7 pages.
Notice of Allowance received for U.S. Appl. No. 14/230,576, dated Oct. 6, 2014, 8 pages.
Response to Final Office Action filed on Sep. 22, 2014, for U.S. Appl. No. 14/230,576, dated Jul. 22, 2014, 9 pages.
Response to Non-Final Office Action filed on Jun. 6, 2014, for U.S. Appl. No. 14/230,576, dated Jun. 2, 2014, 9 pages.
Examiner Initiated Interview Summary received for U.S. Appl. No. 14/592,752, dated Jun. 22, 2015, 2 pages.
First Action Interview Pre-Interview Communication received for U.S. Appl. No. 14/592,752, dated Feb. 26, 2015, 5 pages.
Notice of Allowance received for U.S. Appl. No. 14/592,752, dated Jun. 22, 2015, 9 pages.
Preliminary Amendment filed for U.S. Appl. No. 14/592,752, filed Jan. 21, 2015, 5 pages.
Response to First Action Interview- Pre Interview Communication filed on May 12, 2015, for U.S. Appl. No. 14/592,752, dated Feb. 26, 2015, 7 pages.
First Action Interview Pre-Interview Communication received for U.S. Appl. No. 14/862,550, dated Jan. 26, 2016, 6 pages.
Notice of Allowance received for U.S. Appl. No. 14/862,550, dated Apr. 15, 2016, 7 pages.

(56) References Cited

OTHER PUBLICATIONS

Preliminary Amendment filed for U.S. Appl. No. 14/862,550, filed Oct. 9, 2015, 6 pages.
Response to First Action Interview- Pre Interview Communication filed on Feb. 25, 2016, for U.S. Appl. No. 14/862,550, dated Jan. 26, 2016, 8 pages.
Advisory Action received for U.S. Appl. No. 15/210,555, dated Jul. 19, 2017, 3 pages.
Final Office Action received for U.S. Appl. No. 15/210,555, dated Jun. 2, 2017, 8 pages.
First Action Interview Pre- Interview Communication received for U.S. Appl. No. 15/210,555, dated Mar. 22, 2017, 4 pages.
Non-Final Office Action received for U.S. Appl. No. 15/210,555, dated Aug. 7, 2017, 7 pages.
Notice of Allowance received for U.S. Appl. No. 15/210,555, dated Jan. 29, 2018, 7 pages.
Preliminary Amendment for U.S. Appl. No. 15/210,555, filed Jul. 15, 2016, 5 pages.
Response to Final Office Action and Advisory Action filed on Jul. 20, 2017, for U.S. Appl. No. 15/210,555, dated Jun. 2, 2017 and Jul. 19, 2017, 10 pages.
Response to Final Office Action filed on Jun. 29, 2017, for U.S. Appl. No. 15/210,555, dated Jun. 2, 2017, 11 pages.
Response to Non-Final Office Action filed on Nov. 28, 2017, for U.S. Appl. No. 15/210,555, dated Aug. 7, 2017, 10 pages.
Response to Pre- Interview Communication filed on Apr. 21, 2017, for U.S. Appl. No. 15/210,555, dated Mar. 22, 2017, 5 pages.
Non-Final Office Action received for U.S. Appl. No. 15/904,729, dated May 29, 2018, 10 pages.
Notice of Allowance received for U.S. Appl. No. 15/904,729, dated Sep. 7, 2018, 7 pages.
Notice of Allowance received for U.S. Appl. No. 15/904,729, dated Jul. 26, 2018, 7 pages.
Preliminary Amendment for U.S. Appl. No. 15/904,729, filed Feb. 27, 2018, 7 pages.
Response to Non- Final Office Action filed on May 31, 2018, for U.S. Appl. No. 15/904,729, dated May 29, 2018, 8 pages.

BUSINESS EVENT PROCESSING

RELATED APPLICATIONS

This application is a continuation of U.S. patent application Ser. No. 16/219,141, filed Dec. 13, 2018, now issued as U.S. Pat. No. 10,515,396 which is a continuation of U.S. patent application Ser. No. 15/904,729, filed Feb. 26, 2018, now issued as U.S. Pat. No. 10,185,979, which is a continuation of U.S. patent application Ser. No. 15/210,555, filed Jul. 14, 2016, now issued as U.S. Pat. No. 9,984,397, which is a continuation of U.S. patent application Ser. No. 14/862,550, filed on Sep. 23, 2015, now issued as U.S. Pat. No. 9,589,286, which is a continuation of U.S. patent application Ser. No. 14/592,752, filed on Jan. 8, 2015, now issued as U.S. Pat. No. 9,152,989, which is a continuation of U.S. patent application Ser. No. 14/230,576, filed on Mar. 31, 2014, now issued as U.S. Pat. No. 8,959,532, which is a continuation of U.S. patent application Ser. No. 14/100,223, filed on Dec. 9, 2013, now issued as U.S. Pat. No. 8,769,538, which is a continuation of U.S. patent application Ser. No. 13/602,936, filed on Sep. 4, 2012, now issued as U.S. Pat. No. 8,631,422, which is a continuation of U.S. patent application Ser. No. 12/772,609, filed on May 3, 2010, now issued as U.S. Pat. No. 8,261,289, which is a continuation of U.S. patent application Ser. No. 11/171,595, filed on Jun. 30, 2005, now issued as U.S. Pat. No. 7,779,421, the benefit of priority of each of which is claimed hereby, and each are incorporated herein by reference in their entirety.

FIELD

Various embodiments relate generally to techniques for transaction processing, for example, to processing business events in a networked environment.

BACKGROUND

Business is increasingly being conducted in an electronic environment over network connections. This has rapidly increased the speed with which business is conducted but has also presented a number of challenges for the infrastructure that supports these business transactions.

For example, an infrastructure has to perform a variety of actions each time a directive is issued by a seller or merchant. If a particular merchant issues a large number of directives or if a plurality of merchants all attempt to issue directives at largely the same time, then latency can be experienced and processing load within the infrastructure can become degraded.

Typically, directives of a merchant or other participant involved in a business transaction are queued and sequentially processed in a synchronized fashion. This processing linearity does not fully take advantage of more modern multiprocessing architectures, which means that latency may be experienced while some resources of the business infrastructure remain idle or underutilized. In a similar manner, the processing associated with the actions is typically not multithreaded, which means that multiple instances of a same action cannot process concurrently within a same environment.

In addition, typical business transaction architectures are tightly coupled, which means that changes to the processing flow or the applications processing within the processing flow necessitate additional changes that have to be propagated throughout the infrastructure. As a result, businesses have been reluctant to address latency and load problems associated with their infrastructure; rather the desired approach has been to add additional hardware resources. But, as stated above, in many cases existing hardware resources are underutilized and adding more hardware resources does little to address the real problem. Moreover, in order to take advantage of more modern architectures, the processing flow of the business infrastructure has to be modified and decoupled. The perceived enormity of this task associated with modifying the processing flow of a business's infrastructure has kept businesses on the sidelines and has not produced any viable solutions to infrastructure problems.

BRIEF DESCRIPTION OF THE DRAWINGS

Various embodiments are illustrated by way of example and not limitation in the figures of the accompanying drawings, in which like references indicate similar elements.

DETAILED DESCRIPTION

Methods and systems for business event processing are described. In the following description, for purposes of explanation, numerous specific details are set forth in order to provide a thorough understanding of various embodiments. It will be evident, however, to one of ordinary skill in the art that other embodiments may be practiced without these specific details.

In various embodiments, a request to perform an operation on a listing previously published by an online marketplace may be received. At least one additional listing having certain characteristics in common with the listing may be identified from a plurality of previously published listings including the listing. The operation may be automatically performed on the at least one additional listing. Other features will be apparent from the accompanying drawings and from the detailed description that follows.

Figure 1:
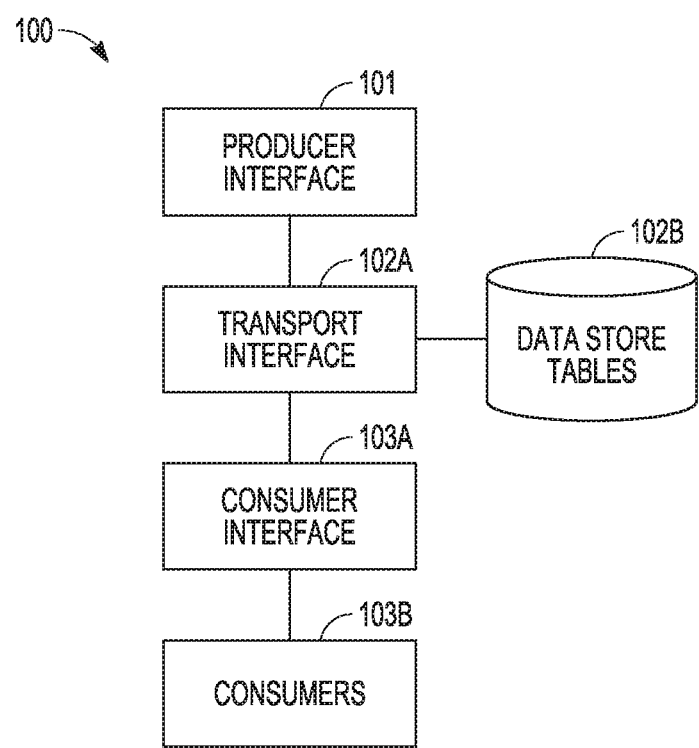
FIG. 1 is a diagram of a business event processing system, according to an example embodiment.

FIG. 1 is a diagram of a business event processing system 100, according to an example embodiment. The business event processing system 100 is implemented in a machine-accessible and/or readable medium and is accessible over a network. The network may be wired, wireless, or a combination of wired and wireless. In an embodiment, the business event processing system 100 is implemented as business event transaction infrastructure over the WWW and is accessible to and interacts with buyers and merchants for purposes of facilitating business transactions between the buyers and merchants.

The business event processing system 100 includes a producer interface 101, a transport interface 102A, and a consumer interface 103A. The transport interface 102 may further include a plurality of data store tables 102B. Furthermore, the consumer interface 103A may also include a plurality of consumers 103B. The three interfaces 101, 102A, and 103A are decoupled from one another, which means that each interface 101, 102A, and 103A do not depend on the other remaining interfaces 101, 102A, or 103A for their operation and functionality.

The producer interface 101 generates events which are managed by the transport interface 102A and processed by the consumer interface 103A. Each of the interfaces 101, 102A, and 103A will now be discussed in turn.

The producer interface 101 is an application, a service, and/or an Application Programming Interface (API) that includes a suite of modules that when accessed perform one or more functions. The producer interface 101 detects directives or actions occurring within a business infrastructure that warrant the creation of an event. The directives or actions are generated by resources. A resource may be an automated program, a service, and/or a user.

The producer interface 101 is designed to monitor or detect when a resource makes a directive or an action that is being watched by the producer interface 101. When such a directive or action is detected, the producer interface 101 generates one or more events to define a subsequent action that the business event processing system 100 should process. An event is defined in terms of business concepts that are relevant to a business entity (e.g., good, service, user, account, bid transaction, etc.).

In some embodiments, the producer interface 101 may not directly interface with the transport interface 102A or may do so in an indirect fashion. For example, the producer interface 101 may write to data store tables managed or monitored by the transport interface 102A. These writes may generate triggers that the transport interface 102A recognizes and processes in the manners discussed herein and below. In fact, the producer interface 101 may directly and indirectly interface with the transport interface in a variety of fashions, such as but not limited to: communicate through a data access layer (DAL) on a transactional basis to write to tables managed by the transport interface 102A, communicate via a data store trigger (writes to a table that causes a trigger to file altering the transport interface 102A), and/or communicates through a database view, where the event table is overlaid on a primary table). Thus, the producer interface 101 can directly or indirectly communicate with the transport interface 102A in a variety of configurable manners. The teachings presented herein are not to be limited to any particular method of interfacing or communication.

Each event is associated with an event type. Moreover, each event may include a payload associated with information supplied by the resource or added by the producer interface 101. The payload portion of the event may be generically represented as name-value pairs, such as "price=$10.00," where "price=" is the name and "$10.00" is the value associated with the name. Again, each payload for a particular event can include a plurality of name-value pairs some of which are acquired or derived from the directives of the resource and some of which are added by the producer interface 101. It should be noted, that in some cases the producer interface 101 may solely generate the payload without any information supplied by the resource.

Some example events, corresponding payloads, and event types for an online auction business event processing system 100 are provided in the following table. It is noted that the example events and payloads are presented for purposes of illustration and that other desired events, payloads, and types of services may be used with the teachings presented herein.

| Event | Payload | Event Type |
| --- | --- | --- |
| New Account | Account Identifier | New Account Event |
| Update Account | Account Identifier | Update Account Event |
| User Switch Billing or Currency Used | Account Identifier | User Switch Billing Event |
| User Update | Account Identifier | User Update Event |
| User Merge | Account Identifier | User Merge Event |
| New Usage | Account Identifier | New Usage Event |
| New Subscription | Account Identifier | New Usage Event |
| Subscription Update | Account Identifier | New Subscription Event |
| Subscription Update | Account Identifier | Subscription Update Event |
| New Wallet | Account Identifier | New Wallet Event |
| Wallet Update | Account Identifier | Wallet Update Event |
| Offer To Post (OTP) | Account Identifier | OTP Event |
| Listing Open | Item identifier | Listing Open Event |
| Purchase Made | Item Identifier | Purchase Made Event |
| Listing Closure (No Bids) | item Identifier | Listing Closure Event |
| Listing Closure (Administrative) | item identifier | Listing Closure Event |
| Listing Cancellation | item identifier | Listing Cancellation Event |
| Item Revise | Quantity, Start Price, Reserve Price, Buy-It-Now Price, Category, Categories | Revise Your Item (RYI) Event |
| New Bid | Item Identifier, Transaction Identifier | New Bid Event |
| Bid Retraction | Item Identifier, Transaction Identifier | Bid Retraction Event |
| Bid Cancellation | Item Identifier, transaction Bid Cancellation Event Identifier | |

The producer interface 101 may execute a variety of calls to its API or to functions of its service for purposes of recognizing an event, assigning an event type, and forming or constructing the payload associated with an event. It should also be noted that the producer interface 101 may be threaded and portions of it may operate in duplicate on the same or different machines. In this manner, the producer interface 101 can generate events their event types and payloads from a plurality of resources concurrently and in parallel within a same machine or across a plurality of machines. The producer interface 101 is thus scalable and can be deployed in a distributed fashion over a plurality of servers within a network. Production of events and their accompanying metadata is achieved in an asynchronous manner that is conducive to the dynamic and chaotic online business environment.

Once the producer interface 101 generates an event, identifies its event type, and forms its payload data, the producer interface represents this data as an intermediate data format, such as a generic object or via an extensible markup language (XML) definition (XSD). This global and generic object of representation is then communicated from the producer interface 101 to the transport interface 102A. Each generically represented event may also include with its metadata a unique transaction identifier, an identifier for the resource, the producer interface 101, and other desired information. An event is not lost if a consumer 103B is down, events are available when the consumer 103B becomes operational after having been down.

The transport interface 102A includes one or more modules or services to acquire an event's name, its type, its unique transaction identifier, and its payload. The event type and transaction identifier are used by the transport interface to manage events produced and received from the producer interface 101.

For example, in an embodiment the transport interface 102A maintains one or more data store tables 102B. Each table 102B is used to house entries for a particular event type and includes the events indexed thereon by transaction identifier. Each row of a table 102B is associated with a specific event type and includes a unique transaction identifier and unique payload. Because the size of some tables 102B may be large for a given event type, multiple tables 102B may be used for any given event type.

In an embodiment, there are three types of tables 102B used by the transport interface 102A in managing events and in distributing events to the consumer interface 103A. A first table type 102B are queue tables that house events to be delivered to the consumer interface 103, entries within any given queue table are associated with a single event type, as described above. Alternatively, a queue table may contain multiple different event types and may be searchable on desired event types. A second table type 102B is a high watermark table. The high watermark table identifies specific consumers 103B of the consumer interface 103A and a transaction identifier representing a last event that was delivered to that particular consumer 1033. This permits the transport interface 102A to determine what has and has not been delivered to particular consumers 103B. A third type of table 102B is a retry or abandon table, this table 102B is used to determine which events are to be resent to which consumers 103B based on policies and which are to be abandoned based on policies.

In an embodiment, there is yet another type of table called a reserved event range table where a range of events (which define a batch) are reserved for a given consumer instance (which is a thread). Once this reservation is complete, the high water mark is moved up to match then last event specified by this reservation.

The transport interface 102A uses one or more conversion or generic interfaces to acquire an event's name, its transaction identifier, its event type, and its payload. Armed with this information, the transport interface 102A internally determines how to store and represent this information for purposes of delivering it to one or more consumers 103B of the consumer interface 103A. Additionally, the transport interface 102A uses one or more conversion or generic interfaces associated with the consumer interface 103A to acquire identifiers for consumers 103B, armed with this information, the transport interface 102A internally determines how to distribute events to those consumers 103B and determines how to manage the events, such as when it is appropriate to resend events to a particular consumer 103B or when it is appropriate to abandon attempts to send events to a particular consumer 103B.

The transport interface 102A provides an external interface that permits the producer interface 101 to communicate events that are produced in a generic representation format and an external interface that permits the consumer interface 103A to request events for processing.

In an embodiment, the transport interface 102A determines which event types to deliver to the consumer interface 103A based on consumer identifiers. A particular consumer 103B of the consumer interface 103A is mapped or associated with a given event type, this mapping permits the transport interface to deliver the appropriate events to a consumer 103B that is designed to process actions in response to a given event type. In some cases a particular consumer 103B may register and be associated with multiple different event types.

According to an embodiment, the transport interface 102A delivers groupings of events for a given event type to particular consumer 103B as a batch of events. The last transaction identifier for the last event in the batch is recorded along with an identifier for the consumer 103B in a high watermark table 102B.

In some cases, the transport interface 102A delivers a same event associated with a given event type to a plurality of different consumers 103B of the consumer interface 103A. This may occur when a given event type warrants multiple disparate actions to be processed within the business event processing system 100 and each consumer 103B is designed to handle a different one of the actions.

The transport interface 102A is designed to abstract and hide the details associated with storing and distributing events for processing. The modules associated with distributing and managing the events may be multithreaded and processed in duplicate across the same or different machines or devices. The tables 1021 uniquely house specific events, such that even if the transport interface 102A is multithreaded deadlocks and conflicts are resolved when access is made to a specific one of the tables 102B for a given event, which is uniquely identified by a transaction identifier.

The consumer interface 103A includes a plurality of consumers 103B. Consumers 103B consume the events and their payloads and perform actions within the business event processing system 100 in response to receiving events from the transport interface 102A. Each consumer 103B is associated with a specific event type or with multiple different event types for which they have registered via the transport interface 102A Multiple consumers 103B may exist for a given event type. Therefore, multiple actions may be processed on a single event, when two consumers 103B are both designed to process or take some action for a given event type associated with the single event.

The consumers 103B are functions, operations, applications, or services that are designed to take some action in response to an event of its type and the payload associated with the event. The consumers 103B may be multithreaded and processed in duplicate within a same machine or across different machines.

During operation of the business event processing system 100, the producer interface 101 generates events and their associated metadata and puts the events in generic formats or objects, which are communicated to the transport interface 102A. The transport interface 102A stores, manages, and distributes the events and their payloads to specific consumers 103B of the consumer interface 103A. In some cases, events are distributed in batches to the consumers 103B. The consumers 103B asynchronously process and/or concurrently process the events. The size of the batches and/or how often consumers 103B receive batches may vary based on profiles, configurations, or environmental settings; and the batch sizes or frequency of receiving batches may be dynamically changed in real time during execution. In some embodiments, the events and their metadata may be communicated and processed in stream formats, such as Universal Resource Locator (URL) stream formats or Java stream formats.

In an embodiment, statistical information about the generated events, their distribution, and their processing may be gathered in generic objects or formats by each of the interfaces 101, 102A, and 103A. The statistical information may be visualized on a screen in configurable and real-time formats or housed in one or more logs or data stores for subsequent evaluation and/or reporting. In addition, security may be used to verify the authenticity of any given event and the parties associated with that event.

As an example, processing scenario associated with the business event processing system 100. Consider an electronic auctioning and bidding system, such as eBay® that implements the business event processing system 100 as an underlying infrastructure. Assume that a merchant desires to re-list 10,000 auctions associated with selling a pair of jeans, such that the original starting price of $20 is to be reduced to $10. Here, the producer interface 101 detects a re-list operation as a directive from a resource (the merchant); in response thereto, the producer interface 101 generates 10,000 events of type relist and formulates the payload for each event with an item number and a new price. The transport interface 102A then stores all 10,000 events in a same table 102B or multiple distributed tables 102B and asynchronously delivers different batches of the events to different instances of a same consumer 103B for concurrent processing. The duplicate instances of the consumers 103B asynchronously update data stores within eBay to reflect the 10,000 jeans are to be relisted with a new start price of $10.

The above example was presented for purposes of illustration only and is not intended to limit the embodiments presented herein. The example illustrates that processing may be asynchronously achieved in a concurrent fashion to more efficiently load balance and effectuate business transactions in a networked environment.

Figure 2:
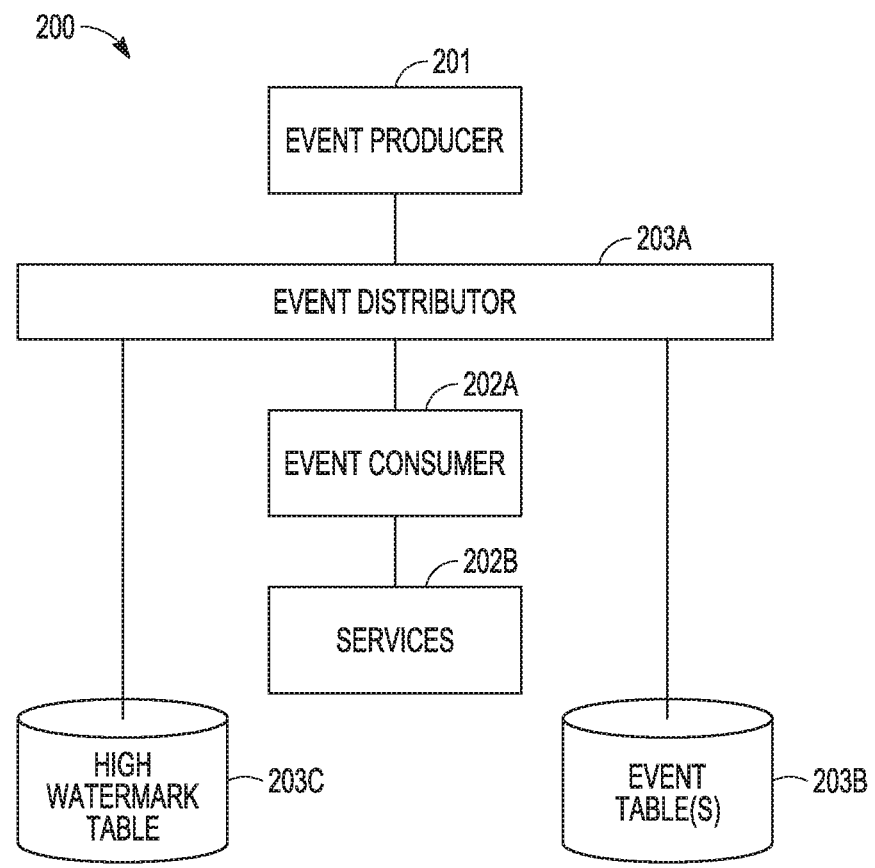
FIG. 2 is a diagram of another business event processing system, according to an example embodiment.

FIG. 2 is a diagram of another business event processing system 200, according to an example embodiment. The business event processing system 200 is implemented in a machine-accessible and/or readable medium and is accessible over a network. The business event processing system 200 presents an alternative view of the business event processing system 100 presented in FIG. 1.

The business event processing system 200 includes an event producer 201, an event consumer 202A, and an event distributor 203A. In an embodiment, the business event processing system 200 also includes one or more event tables 203B, a high watermark table 203C, and/or one or more event consumer services 202B. Each of these will now be discussed in turn.

In an embodiment, the event producer 201 is an event producer means for detecting events and for generating generically represented events and their associated payloads and other metadata. An example of one such means for detecting events and generically representing the events was presented above with respect to the producer interface 101 of the business event processing system 100 depicted in FIG. 1.

According to an embodiment, the event consumer 202A is a means for processing actions in response to events received from an event distributor 203A. The means for processing actions includes a plurality of services 202B; each service 202B is associated with a specific event type. There may be duplicate processing instances of any given service 202B, such that the services 202B may be multithreaded. The services 202B may process event asynchronously and concurrently with one another on a same or a plurality of machines. An example of one such means for processing actions or events was presented above with respect to the consumer interface 101 of the business event processing system 100 depicted in FIG. 1.

In an embodiment, the event distributor 203A is an event distributing means for distributing one or more events to the event consumer 202A. The events are produced by the event producer 201. Services 202B of the event consumer 202A process the events. The event distributing means maintains events received from the event producer 201 in event tables 203B. Each row of a particular event table 203B represents a unique event and each table 203B is associated with a given event type. Multiple event tables 203B may exist for a single event type.

The event distributing means also maintains a high watermark table 203C. The high watermark table 203C records the identity of services 202B along with a last processed event for each of those services 202B. The event distributing means distributes batches of events housed within a given event table 203B to specific services 202B associated with that event table based on event type.

Different batches may be provided to different instances of the same service 202B and same batches may be provided to different services 202B, where each different service 202B performs a different action for the same event type. An example event distributing means was presented above with respect to the transport interface 102A of the business event processing system 100 depicted in FIG. 1.

The business event processing system 200 may be implemented as a series of decoupled services or a decoupled set of object oriented interfaces. The event producer 201 may be multithreaded and processed in duplicate on the same or a variety of machines and so may the event consumer 202A and the event distributor 203A. In an embodiment, the event producer 201 may be associated with an actions being monitored for an online merchant or actions being monitored for a login resource associated with a business service.

The business event processing system 200 provides a processing flow for business transactions in a tripartite fashion. Each portion of the flow is independent of the remaining portions. Thus, the processing of the event producer 201 is independent of the event consumer 202A and the event distributor 203A. Likewise the processing of the event consumer 202A is independent of the processing of the event producer 201 and the event distributor 203A. Finally, the processing of the event distributor 203A is independent of the event producer 201 and the event consumer 202A. This decoupled processing flow within the business event processing system 200 permits events to be detected, generated, housed, distributed, and processed in an asynchronous and concurrent fashion across a single machine or a plurality of machines cooperating with one another. This improves the efficiency of the resources of a business enterprise and reduces processing latency associated with processing business transactions.

Figure 3:
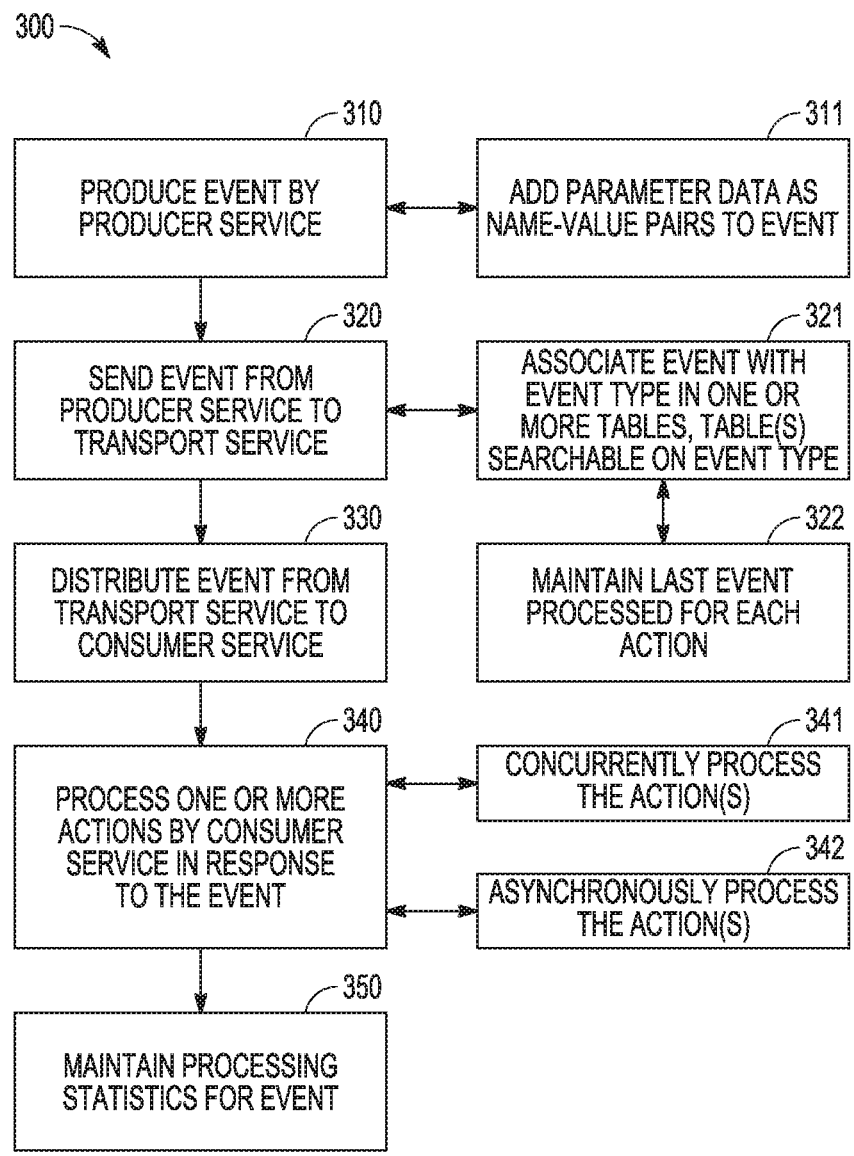
FIG. 3 is a diagram of a method for processing business events, according to an example embodiment.

FIG. 3 is a diagram of a method 300 for processing business events, according to an example embodiment. The method 300 (hereinafter business "event processing service") is implemented in a machine-accessible and/or readable medium and is accessible over a network. In an embodiment, the event processing service is implemented within the business event processing systems 100 or 200 of FIGS. 1 and 2, respectively.

The event processing service may be processed across multiple processors and may be multithreaded, meaning that duplicate instances of the event processing service may process within the same environment and cooperate with one another to perform the processing of the method 300 depicted in FIG. 3.

At 310, the event processing service produces an event using a producer service associated with the event processing service. The producer service is designed to monitor actions or directives of resources. When a particular action or directive is detected by the producer service, the producer service generates an event, which will subsequently be processed by a consumer service associated with the event processing service.

In an embodiment, at 311, the producer service may add a variety of parameter data or other metadata to a produced event as name-value pairs. The event may also be associated with a specific unique identifier, such as a transaction number or identifier. Moreover, the event is associated with an event type that represents a class or category associated with a given produced event. The parameter data, the event type, and the transaction identifier represent metadata associated with a produced event.

The event and its metadata are then generically represented in an intermediate format (e.g., XML, XSD, etc.) or encapsulated in a generic a global class interface, such as when an objected oriented implementation is being used.

At 320, the generic formatted or represented event is then sent to a transport service associated with the event processing service. The uses a conversion or translation service or public methods associate with an interface of the generic event to acquire the metadata associated with the event. In an embodiment, at 321, an identity of a particular table for an event type associated with the event is acquired and the event is populated to that particular table. The table is acquired based on the event type by the transport service and the event is entered within the table based on its transaction identifier. The table is searchable by the transport service.

In still another embodiment, at 322, the transport service maintains a last event processed for a given action of a consumer service associated with the event processing service. The last event processed may be housed in a high watermark table, such as the one depicted and described with the business event processing system 200 of FIG. 2. The last event processed assists the transport service in determining which events have and have not been delivered or distributed to a given action of the consumer service. This assist in managing the events produced by the producer service and determining when they have been delivered and thus processed.

At 330, the transport service distributes the event in the generic format that it received from the producer service from its tables to the consumer service. The consumer service includes one or more actions assigned to the event based on the event's type assignment. Accordingly, at 340, once the consumer service has the event from the transport service, the actions are processed. In an embodiment, the event may be processed by two different actions associated with the same event type. In another embodiment, at 341, at least two of the actions that process the event concurrently process or process in parallel. In still another embodiment, at 342, at least two of the actions that process due so in an asynchronous fashion.

In yet more embodiments, at 350, the processing associated with the sub services of the event processing service, namely the producer service, the transport service, and the consumer service, each maintain statistics associated with the event. The type of information captured and the manner in which the information is evaluated, consumed, and presented can be configured based on the desires of a business enterprise.

Figure 4:
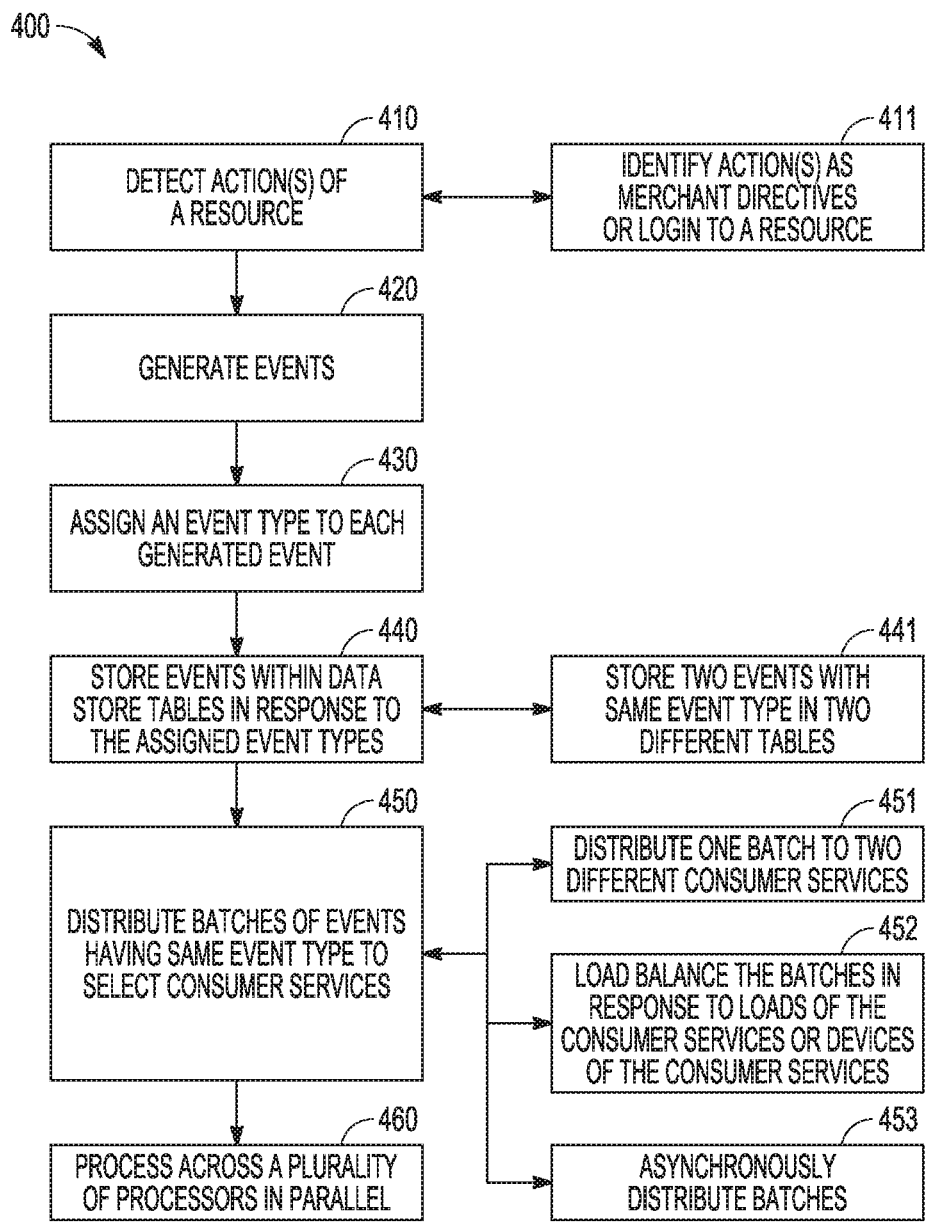
FIG. 4 is a diagram of another method for processing business events, according to an example embodiment.

FIG. 4 is a diagram of another method 400 for processing business events, according to an example embodiment. The method 400 (hereinafter "business event framework service") is implemented in a machine-accessible and/or readable medium and is accessible over a network. The business event framework service represents an alternative view of the method 300 presented above with respect to FIG. 3.

At 410, the business event framework service detects actions associated with a resource. In an embodiment, at 411, the resource may be an online merchant, an automated application, or a user logging into a business service. The resource issues commands or directives associated with an interface of the resource. These commands or directives are monitored by the business event framework service and when detected cause the business event framework service to generate events in response thereto, at 420.

Once an event is generated, the business event framework service, at 430, assigns an event type or class to each generated event. Events may also include other metadata, such as a unique transaction identifier and a payload. The payload may be derived wholly or partly from information supplied by the resource. Alternatively, the payload may be generated entirely by the business event framework service.

At 440, the events are stored along with their accompanying metadata within one or more data store tables. The specific table is identified based on the event type assigned to a given event. In some cases, at 441, two events with the same event type may be stored in two different data store tables. This may be useful when there are an excessively large number of events with the same event type. This provides for improved load balancing of events.

At 450, batches of events having the same event type are distributed to select consumer services for processing. The size of each batch is configurable and the frequency with which a consumer receives a batch is configurable. This configuration may also be altered or modified at runtime. In an embodiment, at 451, a single batch may be distributed to two different consumer services. This may occur when two different consumer services perform different actions on a same event having the same event type. For example, one consumer service may use one portion of the payload to detect fraud conditions for a login event type, while another consumer service may use another portion of the payload to authenticate a resource for access to a business service.

In some embodiments, at 452, the business event framework service may actively load balance the batches that are distributed to the consumer services. The conditions for load balancing may be configurable. For example, the load balancing may consider processing loads associated with the consumer services and/or processing loads associated with machines or devices that are executing the consumer services.

In yet another embodiment, at 453, the business event framework service may asynchronously distribute the batches to the consumer services and distribute the batches concurrently to the consumer services. Additionally, the consumer services may concurrently process with one another.

In still further embodiments, at 460, the business event framework service may execute across a plurality of processors in a parallel fashion.

Additionally, the methods 300 and 400 may be implemented as instructions in machine-accessible and readable medium. The medium when loaded to a machine and accessed performs the methods 300 and 400. The medium does not have to reside on a single medium and may be logically associated across a plurality of different media. Additionally, the medium may be removable medium that is interfaced to a machine and uploaded to the machine for processing. Still further, the instructions may be prefabricated within memory or storage of a machine or downloaded from one machine to another machine over a network. In addition, the instructions may be multithreaded, meaning that duplicate instances of the instructions may process within the same machine or across different machines without colliding with one another and in cooperation with one another.

Figure 5:
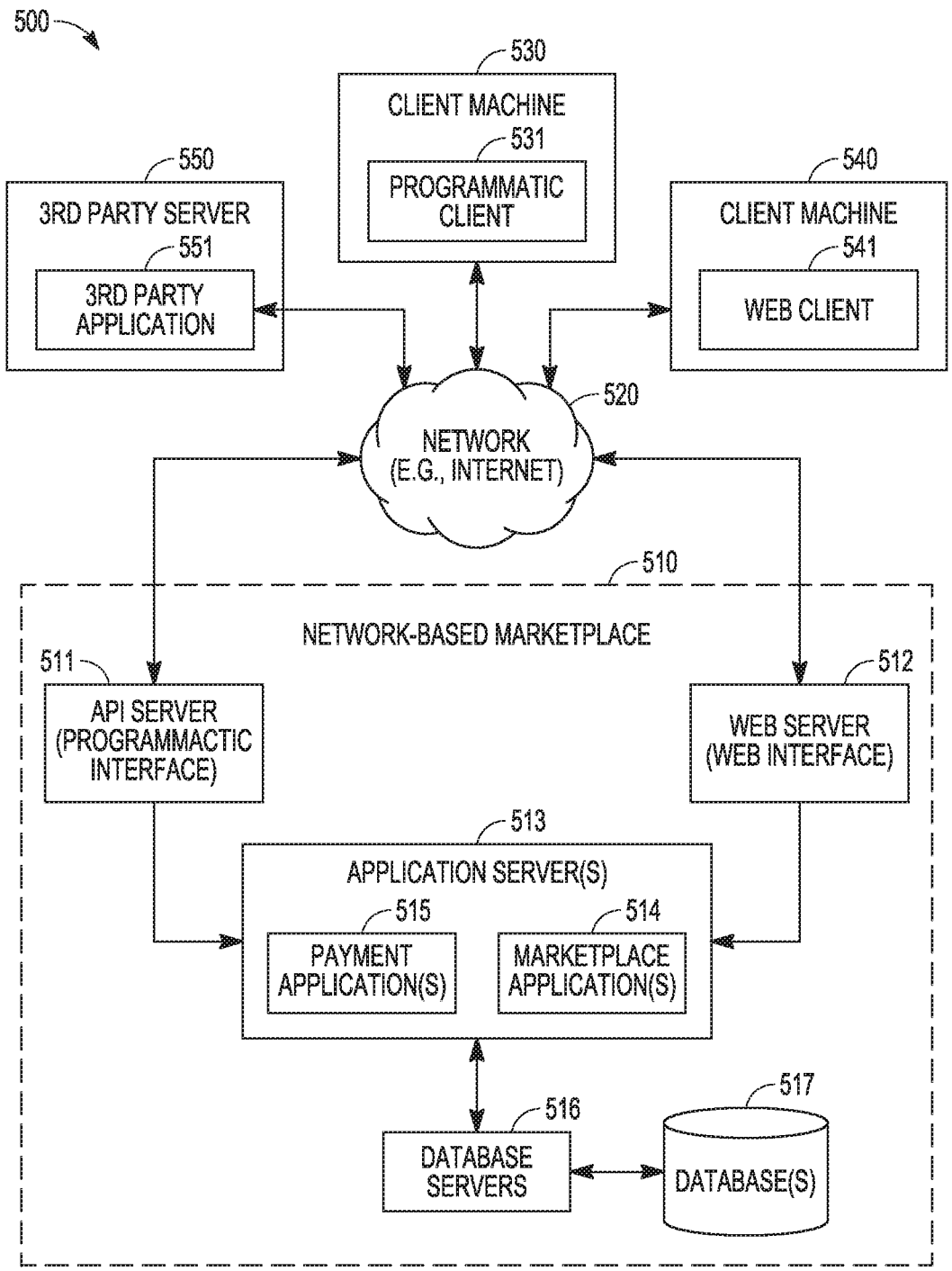
FIG. 5 is a diagram of example network-based commerce system or facility which implements various embodiments.
Figure 6:
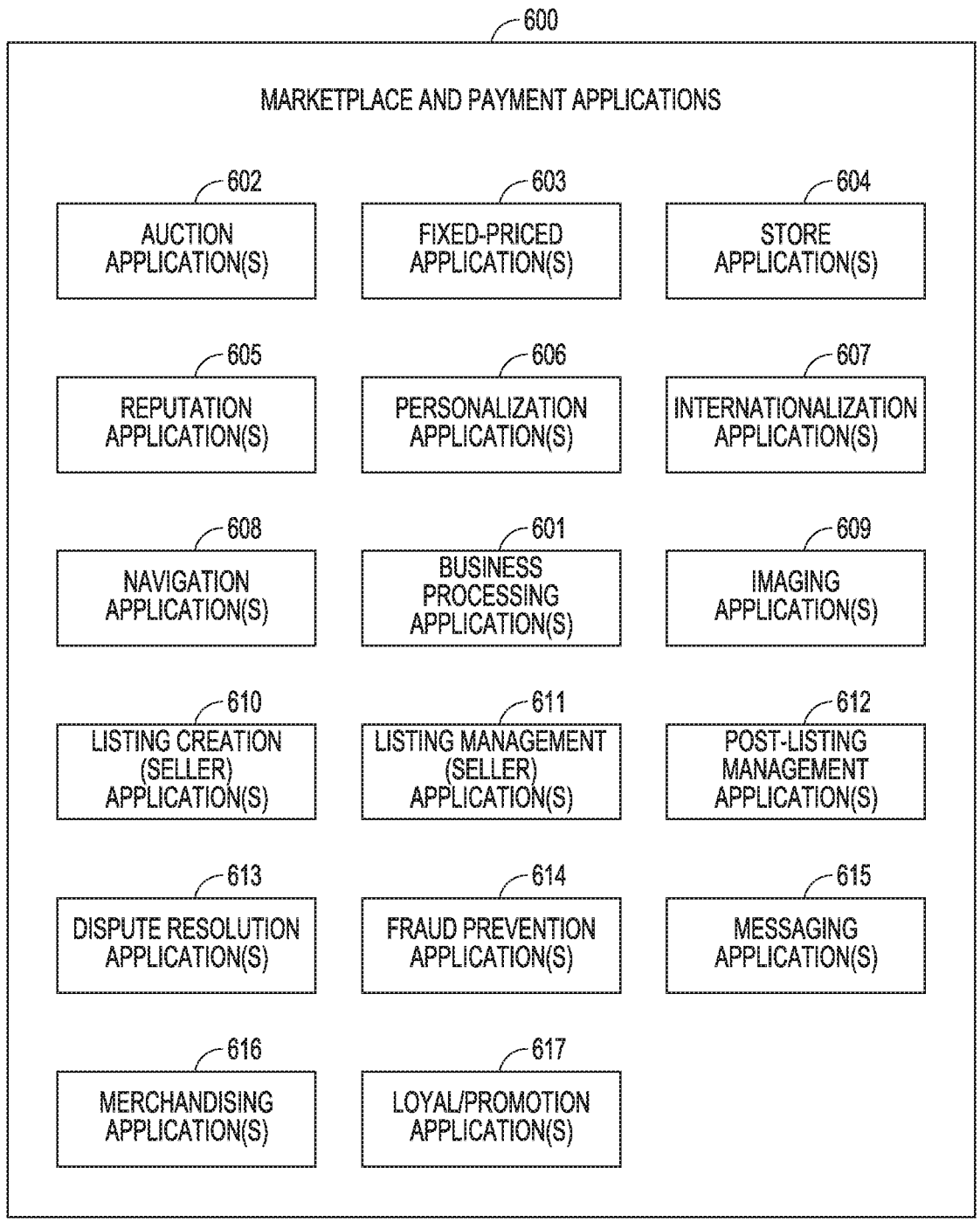
FIG. 6 is a diagram of example applications implemented within some of the components of the network-based commerce system of FIG. 5.
Figure 7:
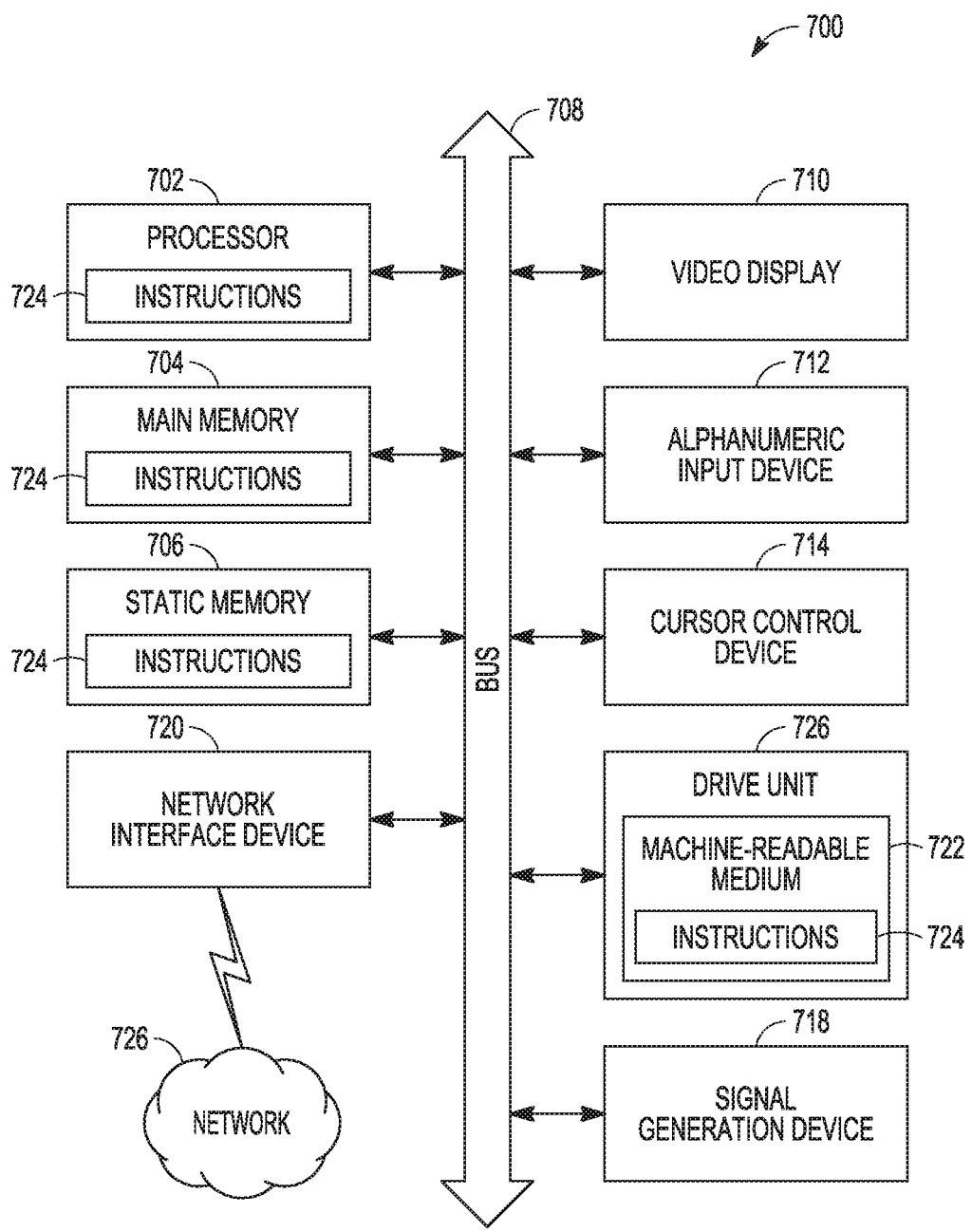
FIG. 7 is a diagram of an example machine architecture, according to various embodiments.

FIGS. 5-7 are now presented as example implementations of the business event processing techniques presented herein. It is understood that these example architectures and arrangements are presented for purposes of illustration only and are not intended to limit other implementations of the teachings presented.

FIG. 5 is a diagram of example network-based commerce system or facility 500 which implements various embodiments. A commerce system 500, in the example form of a network-based marketplace, provides server-side functionality, via a network 520 (e.g., the Internet) to one or more clients.

FIG. 5 illustrates, for example, a web client 541 (e.g., a browser, such as the Internet Explorer browser developed by Microsoft Corporation of Redmond, Wash. State), and a programmatic client 531 executing on respective client machines 540 and 530.

An API server 511 and a web server 512 are coupled to, and provide programmatic and web interfaces respectively to, one or more application servers 513. The application servers 513 host one or more marketplace applications 514 and payment applications 515. The application servers 513 are, in turn, shown to be coupled to one or more databases servers 516 that facilitate access to one or more databases 517.

The marketplace applications 514 provide a number of marketplace functions and services to users that access the commerce system 510. The payment applications 515 likewise provide a number of payment services and functions to users. The payment applications 515 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 514. While the marketplace and payment applications 514 and 515 are shown in FIG. 5 to both form part of the commerce system 510, it will be appreciated that, in alternative embodiments, the payment applications 515 may form part of a payment service that is separate and distinct from the commerce system 510.

Further, while the system 500 shown in FIG. 5 employs client-server architecture, other embodiments are of course not limited to such an architecture, and could equally well find application in a distributed, or peer-to-peer, architecture system for example. The various marketplace and payment applications 514 and 515 could also be implemented as standalone software programs, which do not necessarily have networking capabilities.

The web client 541 accesses the various marketplace and payment applications 514 and 515 via the web interface supported by the web server 512. Similarly, the programmatic client 531 accesses the various services and functions provided by the marketplace and payment applications 514 and 515 via the programmatic interface provided by the API server 511. The programmatic client 531 may, for example, be a seller application (e.g., the TurboLister application developed by eBay Inc., of San Jose, Calif.) to enable sellers to author and manage listings on the commerce system 510 in an off-line manner, and to perform batch-mode communications between the programmatic client 531 and the network-based commerce system 510.

FIG. 5 also illustrates a third party application 551, executing on a third party server machine 550, as having programmatic access to the network-based commerce system 510 via the programmatic interface provided by the API server 511. For example, the third party application 551 may, utilizing information retrieved from the network-based commerce system 510, support one or more features or functions on a website hosted by the third party. The third party website may, for example, provide one or more promotional, marketplace or payment functions that are supported by the relevant applications of the network-based commerce system 510.

FIG. 6 is a diagram of example applications 600 implemented within some of the marketplace applications 514 of the network-based commerce system 510 of FIG. 5. The applications 600 may be hosted on dedicated or shared server machines (not shown) that are communicatively coupled to enable communications between server machines. The architecture of one such example server machine is provided below. The applications themselves are communicatively coupled (e.g., via appropriate interfaces) to each other and to various data sources, so as to allow information to be passed between the applications or so as to allow the applications to share and access common data.

The business event processing applications 601 provide the novel business event processing services described herein. These applications 601 are coupled or interfaced with a variety of other applications in a commerce system 510.

The commerce system 510 may provide a number of listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 600 are shown to include one or more auction applications 602 which support auction-format listing and price setting mechanisms (e.g., English, Dutch, Vickrey, Chinese, Double, Reverse auctions etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 603 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 604 allow sellers to group their listings within a "virtual" store, which may be branded and otherwise personalized by and for the sellers. Such a virtual store may also offer promotions, incentives and features that are specific and personalized to a relevant seller.

Reputation applications 605 allow parties that transact utilizing the network-based commerce system 510 to establish, build, and maintain reputations, which may be made available and published to potential trading partners. Consider that where, for example, the network-based commerce system 510 supports person-to-person trading, users may have no history or other reference information whereby the trustworthiness and credibility of potential trading partners may be assessed. The reputation applications 605 allow a user, for example through feedback provided by other transaction partners, to establish a reputation within the network-based commerce system 510 over time. Other potential trading partners may then reference such a reputation for the purposes of assessing credibility and trustworthiness.

Personalization applications 606 allow users of the commerce system 510 to personalize various aspects of their interactions with the commerce system 510. For example a user may, utilizing an appropriate personalization application 606, create a personalized reference page at which information regarding transactions to which the user is (or has been) a party may be viewed. Further, a personalization application 606 may enable a user to personalize listings and other aspects of their interactions with the commerce system 510 and other parties.

The network-based commerce system 510 may support a number of marketplaces that are customized, for example, for specific geographic regions. A version of the commerce system 510 may be customized for the United Kingdom, whereas another version of the commerce system 510 may be customized for the United States. Each of these versions may operate as an independent marketplace, or may be customized (or internationalized) presentations of a common underlying marketplace. These are represented as the internationalization applications 607 in FIG. 6.

Navigation of the network-based commerce system 510 may be facilitated by one or more navigation applications 608. For example, a search application enables key word searches of listings published via the commerce system 510. A browse application allows users to browse various category, catalogue, or inventory data structures according to which listings may be classified within the commerce system 510. Various other navigation applications may be provided to supplement the search and browsing applications.

In order to make listings, available via the network-based commerce system 510, as visually informing and attractive as possible, the marketplace applications 600 may include one or more imaging applications 609 utilizing which users may upload images for inclusion within listings. An imaging application 609 also operates to incorporate images within viewed listings. The imaging applications 609 may also support one or more promotional features, such as image galleries that are presented to potential buyers. For example, sellers may pay an additional fee to have an image included within a gallery of images for promoted items.

Listing creation applications 610 allow sellers conveniently to author listings pertaining to goods or services that they wish to transact via the commerce system 510 and listing management applications 611 allow sellers to manage such listings. Specifically, where a particular seller has authored and/or published a large number of listings, the management of such listings may present a challenge. The listing management applications 611 provide a number of features (e.g., auto-re-listing, inventory level monitors, etc.) to assist the seller in managing such listings. One or more post-listing management applications 612 also assist sellers with a number of activities that typically occurs post-listing. For example, upon completion of an auction facilitated by one or more auction applications 602, a seller may wish to leave feedback regarding a particular buyer. To this end, a post-listing management application 612 may provide an interface to one or more reputation applications 605, so as to allow the seller conveniently to provide feedback regarding multiple buyers to the reputation applications 605.

Dispute resolution applications 613 provide mechanisms whereby disputes arising between transacting parties may be resolved. For example, the dispute resolution applications 613 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 614 implement fraud detection and prevention mechanisms to reduce the occurrence of fraud within the commerce system 510.

Messaging applications 615 are responsible for the generation and delivery of messages to users of the network-based commerce system 510, such messages for example advising users regarding the status of listings at the commerce system 510 (e.g., providing "outbid" notices to bidders during an auction process or to provide promotional and merchandising information to users).

Merchandising applications 616 support various merchandising functions that are made available to sellers to enable sellers to increase sales via the commerce system 510. The merchandising applications 616 also operate the various merchandising features that may be invoked by sellers, and may monitor and track the success of merchandising strategies employed by sellers.

The network-based commerce system 510 itself, or one or more parties that transact via the commerce system 510, may operate loyalty programs that are supported by one or more loyalty/promotions applications 617. For example, a buyer may earn loyalty or promotions points for each transaction established and/or concluded with a particular seller, and may be offered a reward for which accumulated loyalty points can be redeemed.

FIG. 7 is a diagram of an example machine architecture 700, according to various embodiments. The machine includes a set of instructions, which when executed on the machine cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer architecture 700 includes a processor 702 (e.g., a central processing unit (CPU) a graphics processing unit (GPU) or both), a main memory 704 and a static memory 706, which communicate with each other via a bus 708. The architecture 700 may further include a video display unit 710 (e.g., a liquid crystal display (LCD) or a cathode ray tube (CRT)). The architecture 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the architecture 700, the main memory 704 and the processor 702 also constituting machine-readable media.

The software 724 may further be transmitted or received over a network 826 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of methods described herein. The term "machine-readable medium" shall accordingly be taken to include, but not be limited to, solid-state memories, optical and magnetic media, and carrier wave signals.

Thus, a method and system to provide novel business event processing have been described. Although various embodiments have been described with reference to specific example embodiments, it will be evident that various modifications and changes may be made to these embodiments without departing from their broader spirits and scopes. Accordingly, the specification and drawings are to be regarded in an illustrative rather than a restrictive sense.

The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A method comprising:
   receiving an identification of a first listing and a second listing, the first listing and the second listing being published on an online marketplace;
   receiving a request to perform an action on the first listing and the second listing;
   in response to the request, generating a first event and a second event based on the action, the first event to be performed on the first listing and the second event to be performed on the second listing; and
   in response to the request, performing the first event on the first listing and the second event on the second listing.

2. The method of claim 1, wherein the first event includes an update to a data store.

3. The method of claim 1, wherein the first listing and the second listing have a common characteristic.

4. The method of claim 1, wherein the action allows management of the first listing and the second listing.

5. The method of claim 1, wherein the action modifies a price.

6. The method of claim 1, wherein the second event comprises modifying at least one portion of information included in the second listing.

7. The method of claim 1, further comprising receiving a search for the first listing.

8. A system comprising:
   at least one processor; and
   a memory storing instructions that, when executed by the at least one processor, cause the system to perform operations comprising:
   receiving an identification of a first listing and a second listing, the first listing and the second listing being published on an online marketplace;
   receiving a request to perform an action on the first listing and the second listing;
   in response to the request, generating a first event and a second event based on the action, the first event to be performed on the first listing and the second event to be performed on the second listing; and
   in response to the request, performing the first event on the first listing and the second event on the second listing.

9. The system of claim 8, wherein the first event includes an update to a data store.

10. The system of claim 8, wherein the first listing and the second listing have a common characteristic.

11. The system of claim 8, wherein the action allows management of the first listing and the second listing.

12. The system of claim 8, wherein the action modifies a price.

13. The system of claim 8, wherein the second event comprises modifying at least one portion of information included in the second listing.

14. The system of claim 8, further comprising receiving a search for the first listing.

15. A non-transitory machine-readable medium comprising instructions that, when executed by a machine, cause the machine to perform operations comprising, at least:
   receiving an identification of a first listing and a second listing, the first listing and the second listing being published on an online marketplace;
   receiving a request to perform an action on the first listing and the second listing;
   in response to the request, generating a first event and a second event based on the action, the first event to be performed on the first listing and the second event to be performed on the second listing; and
   in response to the request, performing the first event on the first listing and the second event on the second listing.

16. The medium of claim 15, wherein the first event includes an update to a data store.

17. The medium of claim 15, wherein the first listing and the second listing have a common characteristic.

18. The medium of claim 15, wherein the action allows management of the first listing and the second listing.

19. The medium of claim 15, wherein the action modifies a price.

20. The medium of claim 15, wherein the second event comprises modifying at least one portion of information included in the second listing.

21. The medium of claim 15, further comprising receiving a search for the first listing.

\* \* \* \* \*